United States Patent
Sato et al.

(10) Patent No.: US 7,346,375 B2
(45) Date of Patent: Mar. 18, 2008

(54) ROTATING MECHANISM OF BIAXIAL HINGE AND PORTABLE TELEPHONE WITH THE SAME

(75) Inventors: Hitoshi Sato, Tokyo (JP); Yasuhiro Mitsui, Abiko (JP); Sakae Higano, Saitama (JP); Satoshi Kosugi, Yokohama (JP); Katsumasa Yamaguchi, Sagamihara (JP); Kenichi Sakamoto, Toyonaka (JP)

(73) Assignees: Mitsubishi Steel Mfg. Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 197 days.

(21) Appl. No.: 10/549,538

(22) PCT Filed: Oct. 21, 2004

(86) PCT No.: PCT/JP2004/015970

§ 371 (c)(1),
(2), (4) Date: Sep. 15, 2005

(87) PCT Pub. No.: WO2005/040624

PCT Pub. Date: May 6, 2005

(65) Prior Publication Data

US 2006/0168756 A1    Aug. 3, 2006

(30) Foreign Application Priority Data

Oct. 24, 2003    (JP) .............................. 2003-365228

(51) Int. Cl.
H04M 1/00    (2006.01)

(52) U.S. Cl. ................. 455/575.3; 455/575.4; 16/302

(58) Field of Classification Search ............. 455/575.3, 455/575.4, 575.1; 16/277, 297, 302
See application file for complete search history.

(56) References Cited

U.S. PATENT DOCUMENTS 6,275,376 B1 *    8/2001    Moon .......................... 361/683

(Continued)

FOREIGN PATENT DOCUMENTS

EP    1 288 414    3/2003

(Continued)

*Primary Examiner*—Edward F. Urban
*Assistant Examiner*—Christian A. Hannon
(74) *Attorney, Agent, or Firm*—Flynn, Thiel, Boutell & Tanis, P.C.

(57) ABSTRACT

A biaxial hinge having a rotating mechanism that realizes durability, a good tactile feedback, smaller size and more lightweight is provided for use in a notebook computer or a portable telephone that needs to be smaller and more lightweight. The biaxial hinge is constituted such that a rotating shaft support member is fixed to a rotational shaft support member, a rotation-side member is inserted and attached to the outer periphery of the rotating shaft member, and an opening/closing torque unit mechanism for opening and closing operations is disposed at the rotation-side member, wherein sliding friction torque and click torque are generated by the load produced by a coil spring between pressing members and the rotating shaft support member or a sliding member attached to the rotating shaft member. The rotating mechanism of the biaxial hinge of the present invention affords good durability, a good tactile feedback, and a reduction in size and weight. And, this rotating mechanism is applied to a portable telephone.

11 Claims, 7 Drawing Sheets

U.S. PATENT DOCUMENTS

| | | | |
|---|---|---|---|
| 6,549,789 B1* | 4/2003 | Kfoury | 455/550.1 |
| 6,941,618 B2* | 9/2005 | Kim | 16/337 |
| 6,948,217 B2* | 9/2005 | Higano et al. | 16/303 |
| 7,006,853 B2* | 2/2006 | Kang et al. | 455/575.3 |
| 7,106,357 B2* | 9/2006 | Fukuda et al. | 348/14.02 |
| 7,117,009 B2* | 10/2006 | Wong et al. | 455/556.1 |
| 7,146,195 B2* | 12/2006 | Sudo et al. | 455/575.1 |
| 7,146,197 B2* | 12/2006 | Kang et al. | 455/575.1 |
| 7,158,083 B2* | 1/2007 | Satoh et al. | 343/702 |
| 7,158,816 B1* | 1/2007 | Mizuta et al. | 455/575.3 |
| 7,168,135 B2* | 1/2007 | Jung et al. | 16/367 |
| 7,245,948 B2* | 7/2007 | Jung et al. | 455/575.1 |
| 7,272,423 B2* | 9/2007 | Satoh et al. | 455/575.3 |
| 2003/0064758 A1* | 4/2003 | Mizuta et al. | 455/566 |
| 2004/0132482 A1* | 7/2004 | Kang et al. | 455/550.1 |
| 2004/0192422 A1* | 9/2004 | Watanabe et al. | 455/575.3 |
| 2004/0198474 A1* | 10/2004 | Jung et al. | 455/575.1 |
| 2006/0063570 A1* | 3/2006 | Nishimura | 455/575.3 |

FOREIGN PATENT DOCUMENTS

| | | |
|---|---|---|
| EP | 1 353 488 | 10/2003 |
| JP | 2001-289238 | 10/2001 |
| JP | 2002-155923 | 5/2002 |
| JP | 2003-120653 | 4/2003 |
| JP | 2003-239943 | 8/2003 |

* cited by examiner (1)　　(2)　　(3)　　(4)

(a)

(b)     (c)     (d)

ROTATING MECHANISM OF BIAXIAL HINGE AND PORTABLE TELEPHONE WITH THE SAME

FIELD OF THE INVENTION

This invention relates to a biaxial hinge component that is used in the folding and rotating mechanism parts of electrical devices such as portable telephones, notebook computers, electronic organizers, DVD monitors, and remote controls.

BACKGROUND OF THE INVENTION

Nearly all of the mechanisms to generate sliding friction torque or click torque with the rotating shaft of a conventional biaxial hinge generate this torque in ways: a corrugated spring is directly held against a sliding member, or a cam is held down with a coned disk spring or other such leaf spring (see Japanese Patent Publication 2002-155923).

FIG. 10 illustrates an example of a conventional biaxial hinge structure. A leaf spring 103 formed in a corrugated shape is attached to one end of a rotating shaft 102 disposed through a stamped opening/closing shaft 101, fixing members 104 are rotatably attached to the both ends of an opening/closing shaft, and rotational torque is generated by pressing a friction member 105 attached to the opening/closing haft against the leaf spring 103.

Since torque is generated by utilizing the repulsive force of a leaf spring to press on a friction member, a conventional hinge has problems that include wear of the friction member 105, looseness and chatter caused by deformation (permanent set in fatigue) of the leaf spring 103, poor durability, and so forth. Torque fluctuations and decreased durability over time not only diminish the quality of the device, but also lead to malfunctions. With today's biaxial hinges, more emphasis is placed on ease of operation and tactile feedback during rotation and opening/closing than with past products, and there is a great need for a hinge that is smaller and more lightweight, has better durability, and retains its torque value better.

Also, because a leaf spring or friction member is disposed near the center of the rotating shaft, in conventional hinges, it is difficult to make a hole in the rotating shaft center through which wires or the like can be passed to electrically connect the members linked by the biaxial hinge. The wires therefore have to be routed on the outside of the rotating shaft, the result of which is an increase in the overall size including the wiring.

SUMMARY OF THE INVENTION

It is an object of the present invention to provide a hinge component that achieves durability, good tactile feedback, smaller size and more lightweight, and simple wiring, for use in a notebook computer or a portable telephone that needs to be smaller and more lightweight.

FIG. 11 illustrates an example of a modern portable telephone. FIG. 11(a) is an oblique view of the telephone when open, (b) is a plan view of the same, (c) is a plan view in 90-degree-unfolded state, and (d) is a plan view of the telephone when in standby mode. With such a portable telephone, a mechanism that allows rotational movement is added as shown in FIG. 11(a), and incoming mail and other such information can be visually checked by turning upward the side to which a monitor 106 is provided and closing the case as shown in FIG. 11(d) (this is called the standby mode). A portable telephone such as this, when the user wants to answer an incoming call needs to turn the monitor case and put it into the open state shown in (b).

A portable telephone equipped with a conventional hinge having high rotational torque requires considerable effort to turn, making it difficult to answer a call quickly. If the turning effort is to be decreased in a conventional hinge, the spring force of the leaf spring 103 (see FIG. 10) must be lowered, but since this also lowers the click torque, the telephone tends not to stay open state (b) or the standby state (d).

The present invention is constituted as follows. The first embodiment of the invention brings a biaxial hinge of a biaxial structure having a rotating shaft and an opening/closing shaft, in which a rotating shaft member is fixed to a rotating shaft support member, a rotation-side member is inserted and attached to an outer periphery of said rotating shaft member, and an opening/closing torque unit mechanism for opening and closing operations is disposed to either the left or the right of said rotation-side member, wherein two or more sets of pressing components in which a pressing member with a substantially spherical distal end is incorporated into an elastic body are assembled in the rotation-side member with an embedded structure, at least one groove extending in a radial direction is formed on one side of a sliding member disposed so as to rotate synchronously with the rotating shaft member, in order to abut against the pressing components and generate a click, and said pressing members and said sliding member are elastically pressed together, thereby generating sliding friction torque and click (retraction and retention) torque during rotation.

The second embodiment of the invention is a biaxial hinge of a biaxial structure having a rotating shaft and an opening/closing shaft, in which a rotating shaft support member and a sliding member are closely fixed to a rotating shaft member, a rotation-side member is inserted and attached to an outer periphery of said rotating shaft member, and an opening/closing torque unit mechanism for opening and closing operations is disposed to either the left or the right of said rotation-side member, wherein two or more sets of pressing components in which a pressing member with a substantially spherical distal end is incorporated into an elastic body are assembled in the rotation-side member with an embedded structure, at least one groove extending in a radial direction is formed on one side of the sliding member closely fixed to the rotating shaft support member is formed in order to abut against the pressing components and generate a click, and said pressing members and said sliding member are elastically pressed together, thereby generating sliding friction torque and click torque during rotation.

The third embodiment of the invention is a biaxial hinge of a biaxial structure having a rotating shaft and an opening/closing shaft, in which a rotating shaft support member is closely fixed to a rotating shaft member, a rotation-side member is inserted and attached to an outer periphery of said rotating shaft member, and an opening/closing torque unit mechanism for opening and closing operations is disposed to either the left or the right of said rotation-side member, wherein two or more sets of pressing components in which a pressing member with a substantially spherical distal end is incorporated into an elastic body are assembled in the rotation-side member with an embedded structure, at least one groove extending in a radial direction is formed on a face of the side of the rotating shaft support member that abuts against the pressing member in order to abut against the pressing components and generate a click, and said pressing members and said rotating shaft support member are elastically pressed together, thereby generating sliding friction torque and click torque during rotation. With this invention, the sliding member to elastically abut against the pressing members and generate rotational sliding torque and clicks is omitted, and a groove is provided to generate clicks on the surface of the rotating shaft support member that abuts against the pressing members, which makes it possible to omit parts and achieve a more compact size.

The fourth embodiment of the invention is a biaxial hinge, wherein one of a coil spring, a coned disk spring, a corrugated leaf spring, and a thin leaf spring is employed as the elastic body to generate sliding torque and a click with the rotating shaft. Particularly, by employing a coned disk spring, a corrugated leaf spring or a thin leaf spring instead of a coil spring, a biaxial hinge whose size is reduced can be realized.

The fifth embodiment of the invention is a biaxial hinge, wherein a through-hole is provided in a center of the rotating shaft member, which makes it possible for wiring for electrical connections to be passed between devices connected to the ends of the biaxial hinge.

The sixth embodiment of the invention is a biaxial hinge, wherein a rotation stopper mechanism to restrict a rotational range between the rotating shaft support member or the rotating shaft member and the rotation-side member is provided, thereby, rotational range restriction is possible.

The seventh embodiment of the invention is a biaxial hinge, wherein the opening/closing torque unit mechanism for opening and closing operations is assembled as an independent unit, a click generating mechanism that incorporates a cam or a stopper to limit an opening/closing angle is installed beforehand in said opening/closing torque unit mechanism, and the opening/closing torque unit mechanism is fitted to the rotation-side member. This simplifies assembly and enables it to accommodate an opening/closing mechanism having complex functions.

The electronic devices such as portable telephone are equipped with a biaxial hinge. The result of this constitution realizes a portable telephone equipped with a biaxial hinge that is more compact and that requires less effort to turn the case.

DETAILED DESCRIPTION OF THE INVENTION

Embodiments of the present invention will now be described based on the drawings.

Figure 1:
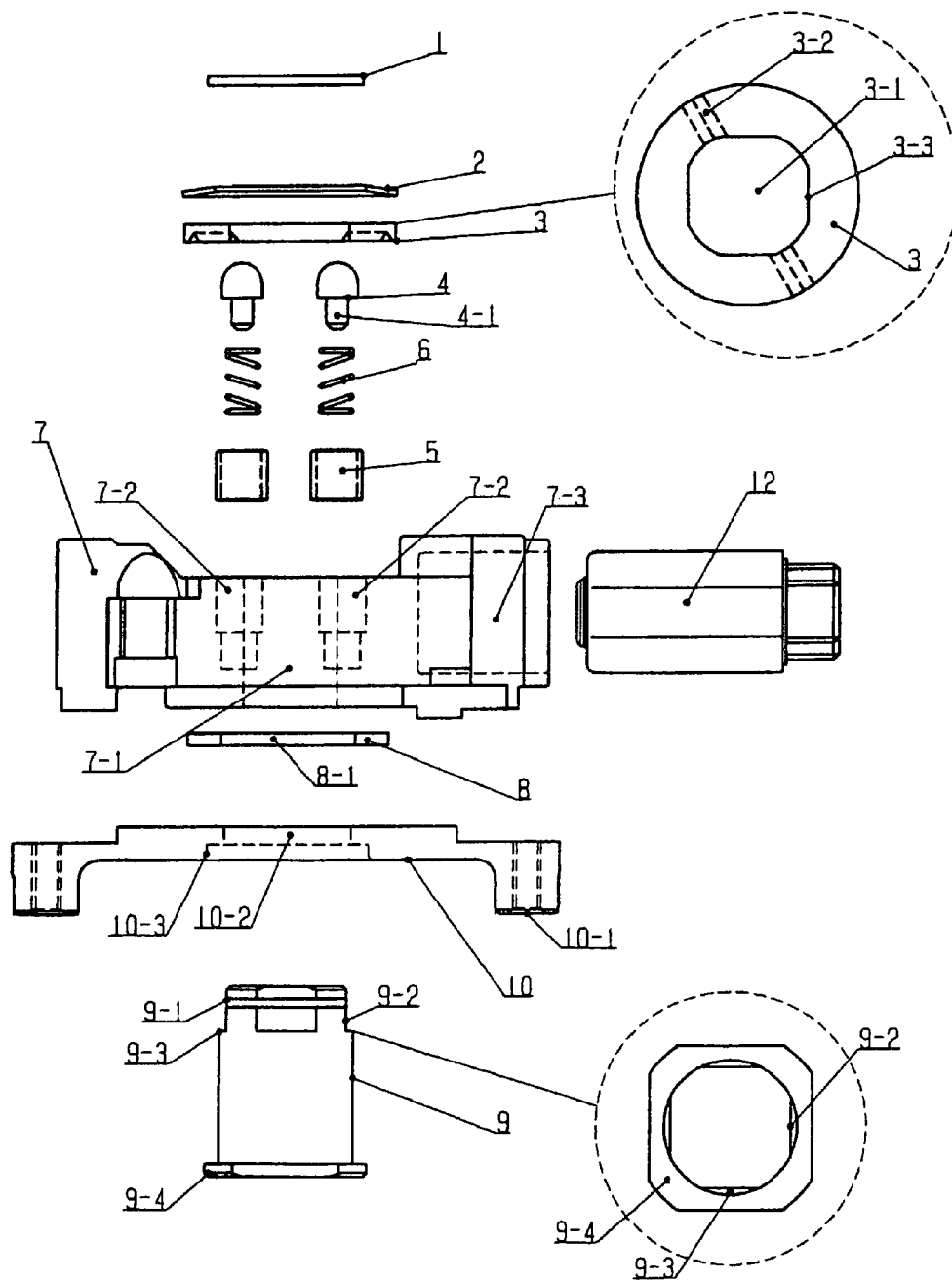
FIG. 1 is a constitutional diagram of the parts pertaining to the first or the fifth embodiment.

FIG. 1 illustrates the constitution of the parts pertaining to the first embodiment for the biaxial hinge of the present invention. The rotation system comprises, from the top of the drawing, a snap ring 1, a spring seat 2, a sliding member 3, a pair of pressing components 4 that are substantially spherical in shape at one end, sleeves 5, coil springs 6 as the elastic body, a rotation-side member 7, a lubrication plate 8, a rotating shaft member 9, and a rotating shaft support member 10. That shows the structure in which an opening/closing torque unit mechanism 12 that is a mechanism for opening and closing operations is attached and fixed by insertion into the rotation-side member 7.

The sliding member 3 is formed by metal stamping so that the outer periphery is circular in shape, and a square hole 3-1 is provided in the center part. The square hole 3-1 of the sliding member 3 accepts the insertion of an end 9-2 of the rotating shaft member 9, so that the sliding member 3 and the rotating shaft member 9 rotate synchronously. The shape of the fitting hole 3-1 of the sliding member 3 can be square, elliptical, hexagonal, or any other shape other than circular that will accept the insertion of the end 9-2 of the rotating shaft member 9 and prevent this end from chatter, slip, or spin. Two V-shaped grooves 3-2 extending in the radial direction are provided on the lower surface of the sliding member 3. In the drawing, the grooves 3-2 to generate clicks are disposed at two locations. The shape of the grooves 3-2 can be selected from among box-shaped, U-shaped, and stepped, as dictated by the shape of the pressing members 4 or the desired torque, sound, durability, and so forth. The grooves 3-2 are not limited to being grooves extending in the radial direction, and may instead be semicircular, elliptical, or rectangular depressions, or punched holes.

The grooves, recesses, holes, or the like used to generate clicks can be arranged with a combination of them in a row along the circumference of the sliding member 3 according to the required click characteristics (torque strength, sound, durability, number), the result being a hinge that gives off different clicks according to the position during rotation. For instance, it is possible to generate clicks at six locations during 360° rotation by employing a sliding member 3 in which grooves are disposed every 60° around the circumference.

Also, in order to ensure stable sliding torque, the sliding surface of the sliding member 3 may have a groove structure whose path is scribed by the pressing members 4 that move in contact in the circumferential direction, although only the click grooves 3-2 are depicted in the drawings. As the sliding member 3, mold or sinter of a metal, plastic, or the like can be utilized, its hardness may be adjusted by heat treatment according to the wear and durability, and it may also be subjected to a surface hardening treatment by plating, nitriding, or the like.

The pressing members 4 are cylindrical, with their distal ends worked into a spherical shape, and protrusions 4-1 to guide the coil springs 6 are provided on the sides opposite the spherical sides. The pressing members 4, the coil springs 6, and the sleeves 5 together make up the pressing components, and the pressing components are embedded in the rotation-side member 7.

FIG. 1 shows an example in which a pair of pressing components is used, but two or more may be installed according to the required click characteristics, as described above for the sliding member 3. When a plurality are installed, they may be disposed around the circumference at different distances from the axis center of the rotation-side member. The pressing members 4 need to have equal wear and durability characteristics to the sliding member 3, then they may be adjusted for hardness by heat treatment, or subjected to a surface hardening treatment such as plating, nitriding, or the like.

The sleeves 5 are metal cylinders, are attached to the rotation-side member 7, and serve to guide the pressing members 4 to allow smooth up and down operation. If the material and working precision of the rotation-side member 7 allow the pressing members 4 to move smoothly, then the sleeves 5 can be made of resin or omitted.

The rotation-side member 7 is a diecast product from resin or metal, and in its center it has a hole 7-1 through which the rotating shaft member 9 is rotatably inserted, holes 7-2 that accommodate the coil springs 6 and in which the pressing members 4 are disposed via the sleeves 5, and a hole 7-3 to which the opening/closing torque unit mechanism 12 is attached.

The lubrication plate 8 is a thin resin plate having in its center a hole 8-1 to insert the rotating shaft member 9, and is disposed to prevent no direct friction between the rotation-side member 7 and the rotating shaft support member 10. The material can be appropriately selected as dictated by the durability required for the biaxial hinge, and therefore does not necessarily have to be resin, and may in some cases be omitted.

The rotating shaft member 9 is in the form of a metal cylinder, and has at its upper end a groove 9-1 to fix the snap ring 1, a portion 9-2 that mates with the inner hole 3-1 of the sliding member 3, a shoulder 9-3 that abuts the lower surface of the sliding member 3, and a substantially square flange 9-4 to closely fix the rotating shaft support member 10 and the rotating shaft member 9.

The rotating shaft support member 10 is a bracket to fix the hinge to the case of the external device, and the rotating shaft support member 10 has screw holes 10-1, a hole 10-2 to pass through the rotating shaft member 9, and a substantially square recess 10-3 that engages with the flange 9-4 of the rotating shaft member 9.

The assembly of the biaxial hinge will be described from the lower side in FIG. 1. The rotating shaft member 9 is inserted into the rotating shaft support member 10, the flange 9-4 of the rotating shaft member is fitted and fixed to the recess 10-3 of the rotating shaft support member 10, and the lubrication plate 8 and the rotation-side member 7 are inserted into the rotating shaft member 9. Next, the coil springs 6, the sleeves 5, and the pressing members 4 are inserted into the holes 7-2 of the rotation-side member 7. The sliding member 3 is inserted into the rotating shaft member 9 until abutting the shoulder 9-2 of the rotating shaft member 9, fitted and fixed. Finally, the spring seat 2 is inserted, and the snap ring 1 is fixed in the groove 7-1 of the rotating shaft member 9, with the spring seat 2 in a compressed state. Using the spring seat 2 and the snap ring 1 is one way to fix the sliding member 3 so that it cannot come off upward, but the sliding member 3 may instead be crimped, welded, pinned, or otherwise fixed to the rotating shaft member 9. The vertical positioning of the sliding member 3 is accomplished as follows in this example; the sliding member 3 abuts the shoulder 9-3 of the rotating shaft member 9 and is pressed between the snap ring 1 and the shoulder 9-3 of the rotating shaft member 9, which stabilizes the sliding torque or click torque generated between the sliding member 3 and the pressing members 4. However, the structure may be simplified by omitting the abutting shoulder 9-3 and vertically positioning with the snap ring 1. The opening/closing torque unit mechanism 12 is finally inserted and fixed in the hole 7-3 of the rotation-side member 7.

Figure 2:
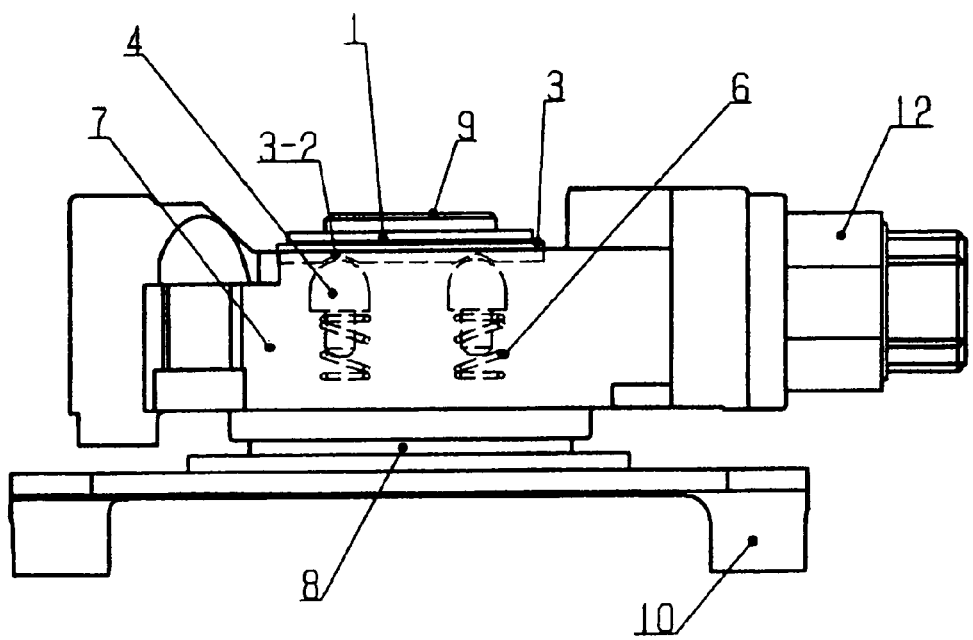
FIG. 2 is a front view of the completed product, and illustrates the first embodiment.

FIG. 2 is a front view of the completed product of the first embodiment, which is a biaxial hinge assembled from the parts shown in FIG. 1. In FIG. 1, the sliding member 3 and the pressing members 4 are pushed by the load (repulsive force) of the coil springs 6, generating sliding resistance torque, and as the rotation-side member 7 rotates, click torque is generated when the pressing members 4 engage with the grooves 3-2 of the sliding member 3. This embodiment involves the combination of a pair of pressing members 4 and a sliding member 3 having grooves at two locations. In the example of the pair of pressing members 4 and the grooves 3-2 shown here, clicks are generated every 180°. The position of the clicks in the rotational direction and the strength of the sliding torque or click torque in the rotational direction required by the hinge can be varied by adjusting the number of grooves 3-2 provided to the sliding member 3, the number and distal end shape of the pressing members 4, and the spring force of the coil springs 6, so hinges with different rotational operation can be obtained with ease.

The pressing members 4 in this embodiment are substantially spherical at their distal ends, so they abut against the sliding member 3 over just a tiny surface area, which gives a rotational sensation of smooth sliding friction torque. With the coil springs 6 having a small spring constant, there is little difference in load when the pressing members 4 are abutting against the flat portion 3-3 of the sliding member and when they are engaged in the grooves 3-2 of the sliding member 3, generating a powerful click torque. Furthermore, even if sliding friction results in wear of the sliding member 3 or the pressing members 4, there will be little reduction in the load of the coil springs 6, which means that the resulting biaxial hinge will have excellent durability, with little change in torque due to sliding wear.

Figure 3:
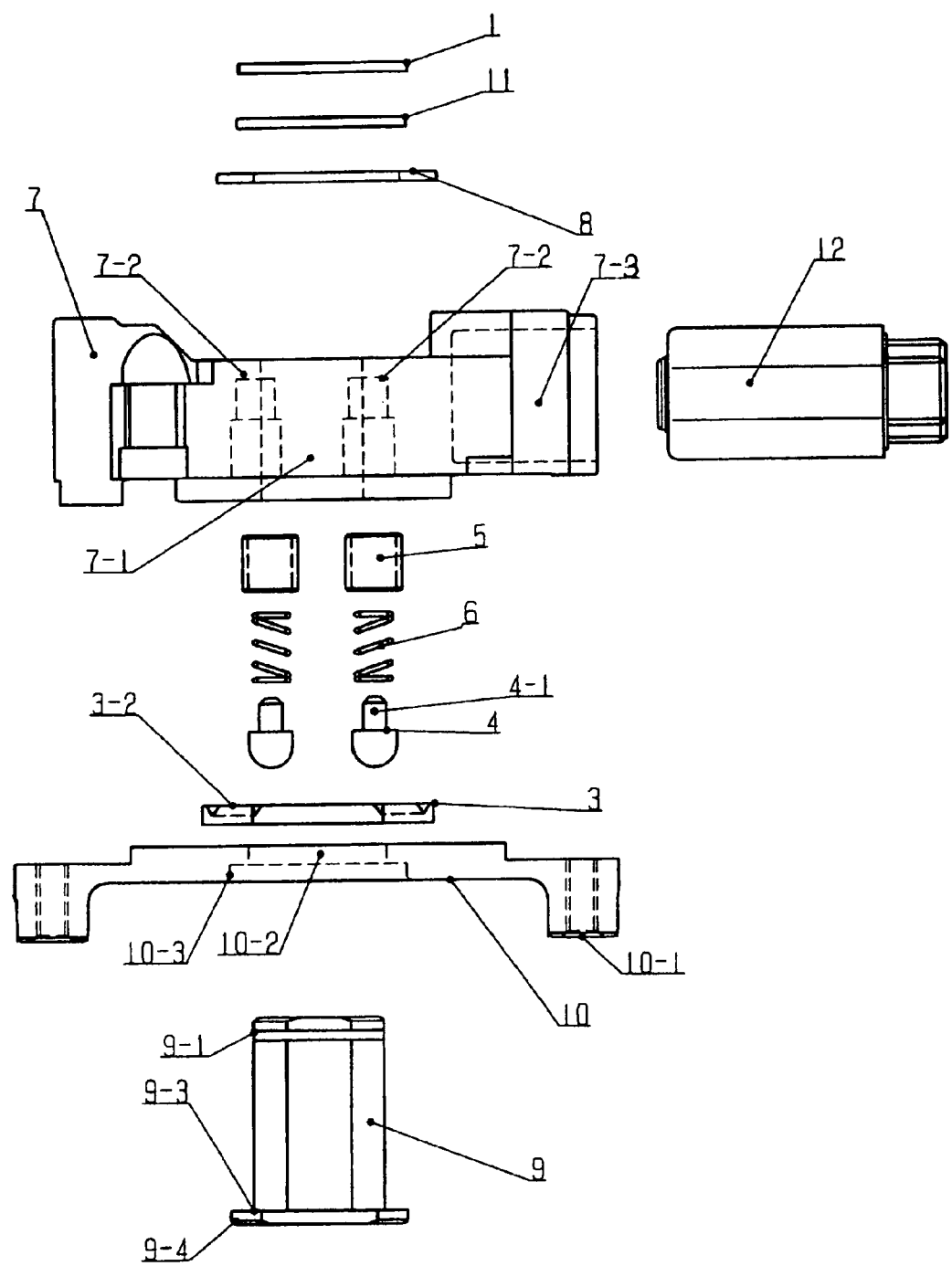
FIG. 3 is a constitutional diagram of the parts pertaining to the second embodiment.

FIG. 3 shows the constitution of the parts pertaining to the second embodiment for the biaxial hinge of the present invention. The sliding member 3 is closely fixed to the rotating shaft member 9, and the grooves 3-2 are disposed facing upward. The pressing members 4, the sleeves 5, and the coil springs 6 are disposed on the lower side of the rotation-side member 7, and are fixed by a fixing ring 11 and the snap ring 1 via the lubrication plate 8. The provision of the lubrication plate 8 takes into account the friction between the fixing ring 11 and the rotation-side member 7, and can be omitted according to the durability, torque, rotational feel, and so forth required by the biaxial hinge.

By the present invention, the structure of the upper and lower sides of the rotation-side member 7, that is, the portion that generates the rotational torque, of the examples shown in FIG. 1 illustrating the first embodiment and FIG. 3 illustrating the second embodiment, respectively, can also be provided to the upper and lower sides of a single rotation-side member 7. A hinge in which the rotational torque generating component is disposed on the upper and lower sides of the rotation-side member 7 is effective to reduce size, to use many click generation components and to deal with requirements of a large rotational sliding torque or high durability.

Figure 4:
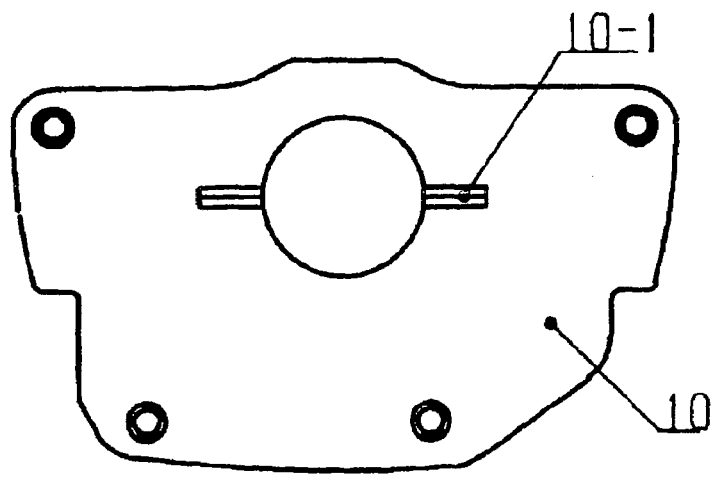
FIG. 4 is a constitutional diagram of the parts pertaining to the third embodiment.

In contrast to the example of the second embodiment shown in FIG. 3, FIG. 4 shows an example of the third embodiment, in which the sliding member 3 used in is omitted, and grooves 10-1 to generate clicks are provided on the surface of the rotating shaft support member 10 that abuts against the pressing members 4. The grooves 10-1 are provided at two locations on the upper surface of the rotating shaft support member 10, and sliding friction torque and click torque can be generated by these grooves 10-1 and the pressing members 4. The rotating shaft support member 10 may be adjusted for hardness by heat treatment, or may be subjected to plating, nitriding, or another such surface hardening treatment, as dictated by the durability required of the biaxial hinge. Omitting the sliding member 3 reduces the number of parts and therefore simplifies assembly.

Figure 5:
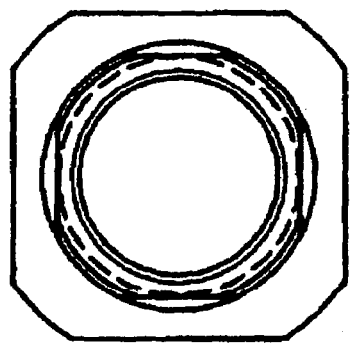
FIG. 5 is a diagram of the parts pertaining to the fifth embodiment.
Figure 5:
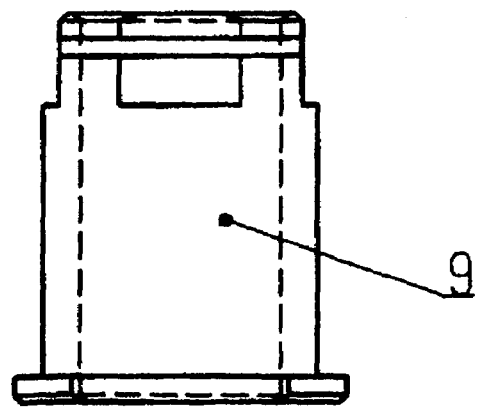

FIG. 5 shows an example of the rotating shaft member 9 of the fifth embodiment. A hole is provided in the center of the rotating shaft member 9 used in the examples of the first and second embodiments. This hole indicates that an audio/video cable, an antenna cable, or the like can be routed for example from the keyboard side to the monitor side in the device that uses the biaxial hinge.

Figure 6:
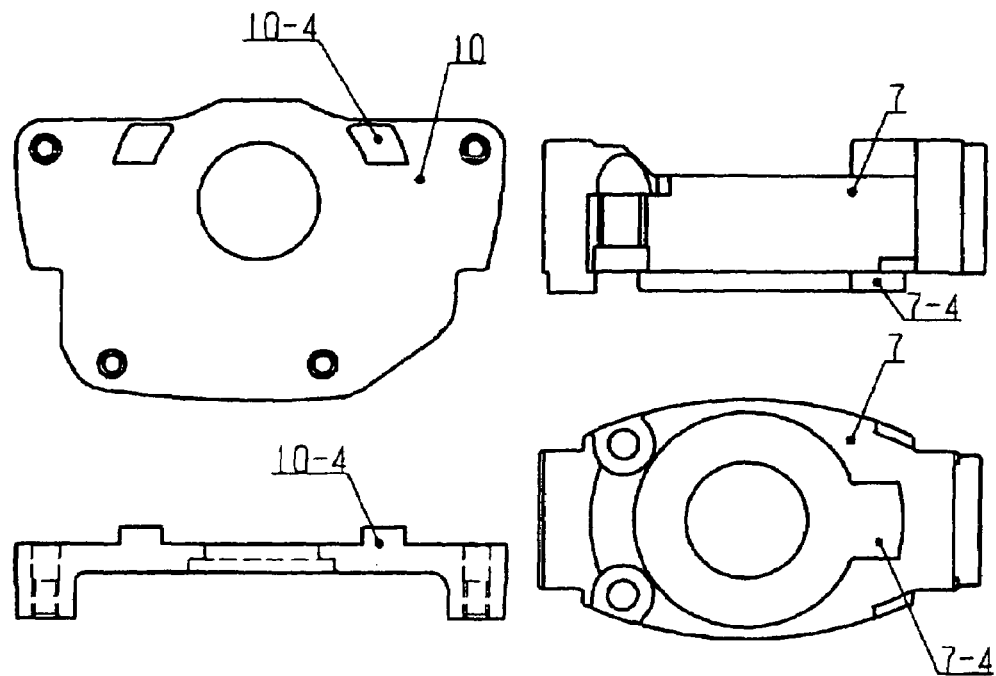
FIG. 6 is a diagram of the parts pertaining to the sixth embodiment.

FIG. 6 is an example of a stopper mechanism on the rotation side of the biaxial hinge in the sixth embodiment. This drawing shows a side and the bottom of the rotation-side member 7, and a side and the top of the rotating shaft support member 10. When the rotation-side member 7 rotates, a protruding stopper 7-4 of the rotation-side member 7 comes into contact with two protruding stoppers 10-4 of the rotating shaft support member 10, preventing any further rotation. In this example, a stopper structure in which the protruding stoppers 7-4 and 10-4 allow a range of rotation of 180° is shown. The rotational range required by the biaxial hinge can be altered by varying the number, position, and shape of the protruding stopper 7-4 of the rotation-side member 7 and the protruding stoppers 10-4 of the rotation-side member 7. Since the stoppers are provided to the rotation-side member 7 and to the rotating shaft support member 10 simultaneously when the molding of the parts, a rotation stopper mechanism can be obtained without adding any special stopper members.

Figure 7:
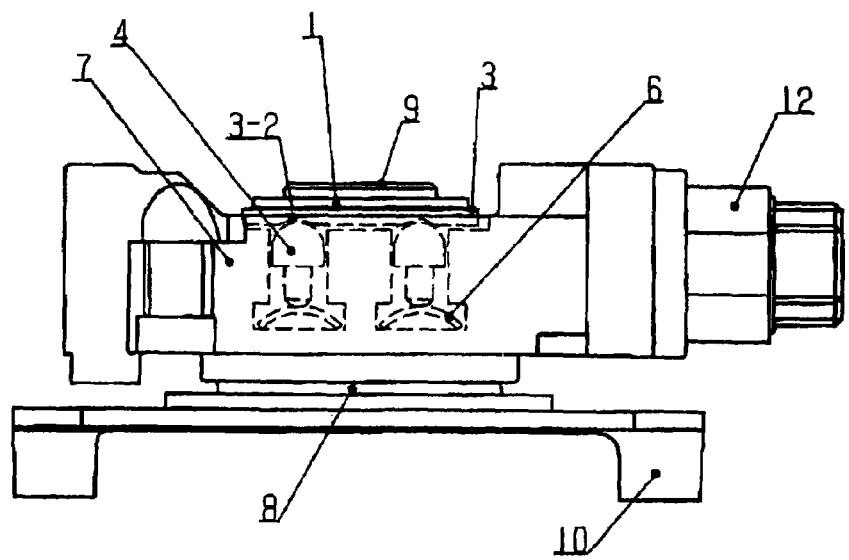
FIG. 7 is a constitutional diagram of the parts pertaining to the fourth embodiment.

FIG. 7 shows the invention of the fourth embodiment, in which a coned disk spring, a corrugated leaf spring, or a thin leaf spring is employed instead of a coil spring as the elastic body to generate sliding torque and clicks during rotation of the biaxial hinge, which results in a more compact size. The drawing shows a state in which the repulsive force of conical leaf springs 6 is imparted to the pressing members 4. The shape of the coned disk spring, corrugated leaf spring, or thin leaf spring may be the one shown in the drawing, or a crescent shape or doughnut shape matching the shape of the sliding member 3 and being along the outer periphery of the rotating shaft member 9 can also be used. The thickness of the rotation-side member 7 in the rotational axis direction can be decreased by scrutiny of the shape of the leaf springs 6 and the pressing members 4.

Figure 8:
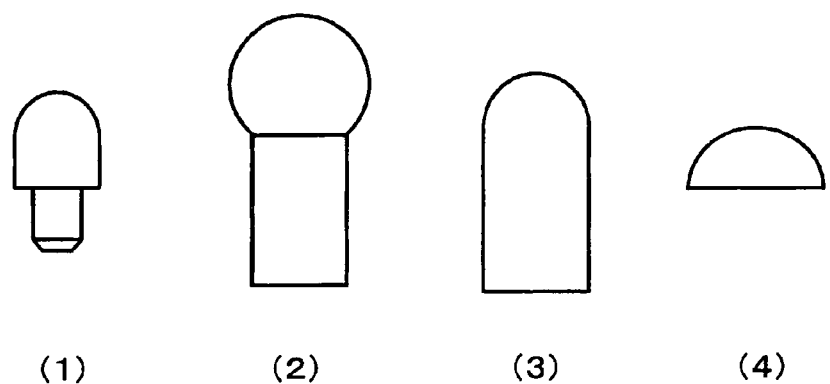
FIG. 8 is a diagram of the parts pertaining to the first or the second embodiment.

FIG. 8 illustrates the shape of the pressing member used in the present invention. FIG. 8-(1) in this drawing is the same as in the examples shown in FIGS. 1 and 3, FIG. 8-(2) is a protrusion that is spherical at the distal end, FIG. 8-(3) is a simple shape that is spherical at the distal end of a cylinder, and FIG. 8-(4) is a hemisphere. Although not shown in the figure, a sphere such as a ball bearing can be obviously used.

Figure 9:
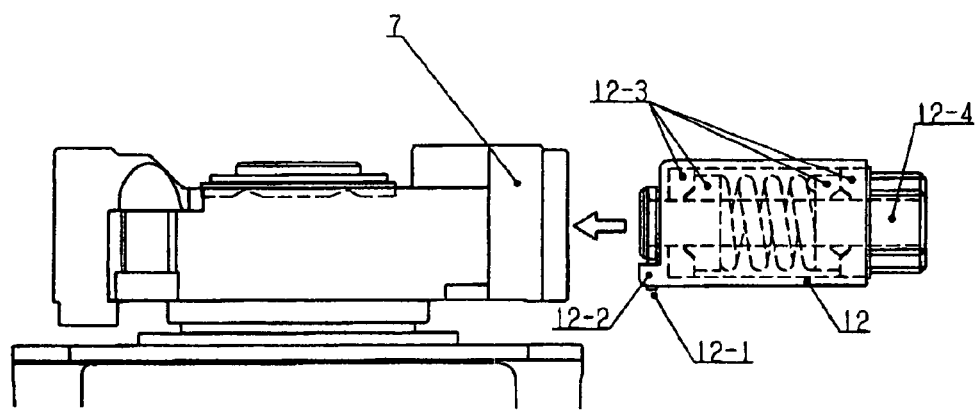
FIG. 9 is a diagram of the parts pertaining to the seventh embodiment.
Figure 10:
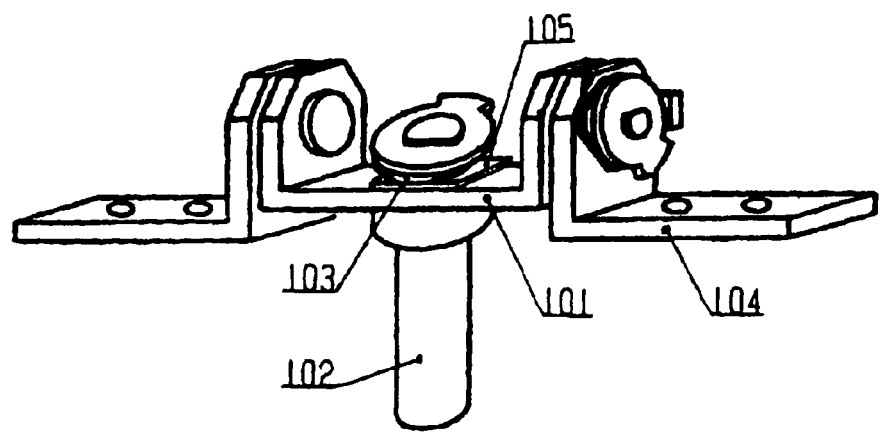
FIG. 10 is an assembly diagram illustrating an example of a conventional biaxial hinge structure.

FIG. 9 is an example of the invention of the seventh embodiment, in which the opening/closing torque unit mechanism of the biaxial hinge has been assembled as an independent unit, and then fitted to the rotation-side member 7. Furthermore, in FIG. 9, a click generating mechanism that combines stoppers 12-1 and 12-2 and cams 12-3 to limit the opening/closing angle, and a case connecting socket 12-4, is installed on the opening/closing torque unit mechanism 12 in advance then this opening/closing torque unit mechanism is used. A biaxial hinge that can generate clicks, can limit its opening/closing angle and can be simply assembled is obtained by fitting the opening/closing torque unit mechanism 12 to the rotation-side member 7 after first assembling it as an independent unit.

Figure 11:
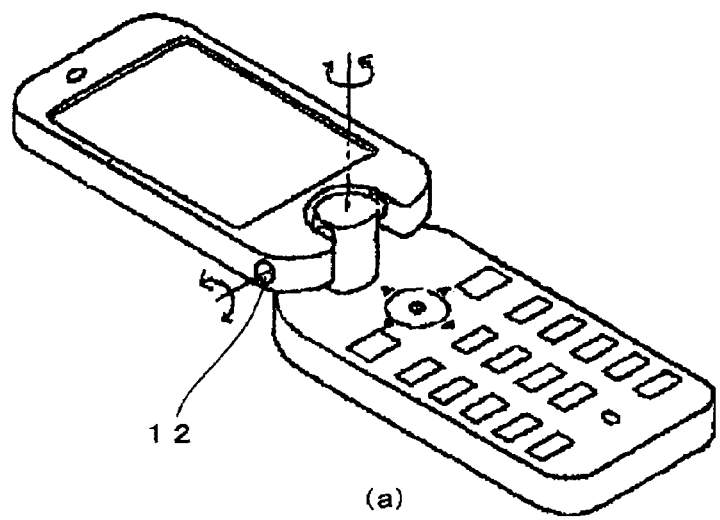
FIG. 11 is an explanatory diagram of a portable telephone to which the biaxial hinge of the present invention is applied.
Figure 11:
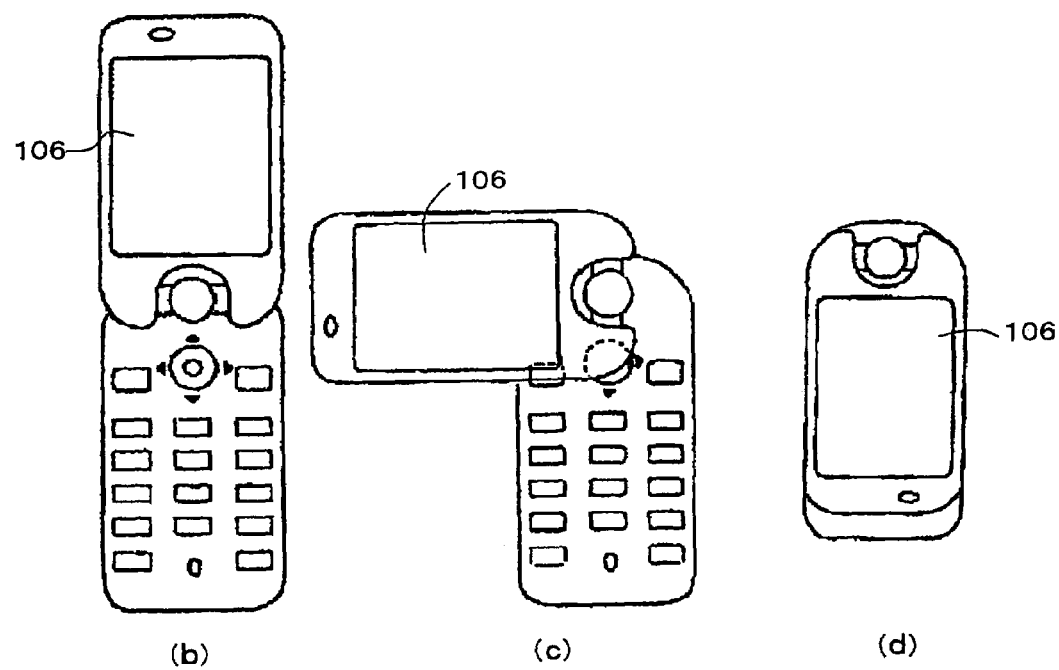

Since a portable telephone equipped with the biaxial hinge of the present invention can reduce sliding torque without decreasing click torque by incorporating the opening/closing torque unit mechanism 12 and so forth of the present invention into the portable telephone shown in FIG. 11, which realize a portable telephone that can be turned with a light operation feel.

INDUSTRIAL APPLICABILITY

The effect of the first embodiment of the invention is that sliding torque and click torque can be ensured with high durability in a torque generating mechanism on the rotation side of a biaxial hinge.

The effect of the second embodiment of the invention is that when the assembly of parts used in the first embodiment is changed, sliding torque and click torque can be ensured with high durability in a torque generating mechanism on the rotation side, just as in the first embodiment.

In the third embodiment of the invention, the sliding member 3 of the first and the second embodiments is omitted, and there is direct abutment of a rotating shaft support member 10 to which pressing members 4 and grooves have been added, so the effect of is that even though parts are omitted, good hinge characteristics can be maintained and assembly is easier.

The fourth embodiment of the invention employs one or more of a coil spring, a coned disk spring, a corrugated leaf spring, and a thin leaf spring as the elastic body. Here, the effect is that the use of a coned disk spring, a corrugated leaf spring, or a thin leaf spring instead of a coil spring results in a more compact size.

The effect of the fifth embodiment of the invention is that by providing a hole in the center of the rotating shaft member 9, it is possible for wiring for electrical connections to be passed between devices connected to the ends of the hinge.

The effect of the sixth embodiment of the invention is that by providing stoppers directly to the rotation-side member 7 and the rotating shaft support member 10, it is possible to obtain a biaxial hinge with a limited range of rotation.

The effect of the seventh embodiment of the invention is that fitting the unit for opening and closing operations to the rotation-side member 7 simplifies assembly and newly adds a stopper mechanism or a limiting the opening/closing angle.

The effect of the electronic devices such as the portable telephone equipped with the biaxial hinge is that a lighter operation feel can be obtained because the effort required by turning can be reduced without lowering the locking force of the monitor-side case or control key-side case in a standby mode and an open state, and since click torque can be generated over a wider region, the resulting portable telephone has a higher-quality feel to its operation.

The invention claimed is:

1. A biaxial hinge of a biaxial structure having a rotating shaft and an opening/closing shaft, in which a rotating shaft member is fixed to a rotating shaft support member, the biaxial hinge has a sliding member disposed so as to rotate synchronously with the rotating shaft member, a rotation-side member which rotates around the rotating shaft member, two grooves which are formed on one side of the sliding member facing the rotation-side member, two guide members are fixed to the rotation-side member to accommodate two pressing members, respectively, therein and guide movements of the respective two pressing members and two elastic bodies which independently press the respective two pressing members, and an opening/closing torque unit mechanism with an opening/closing shaft for opening and closing operations to be perpendicular to the rotating shaft member is disposed at either the left or the right of said rotation-side member.

2. The biaxial hinge according to claim 1, wherein one of a coil spring, a coned disk spring, a corrugated leaf spring, and a thin leaf spring is employed as the elastic body.

3. The biaxial hinge according to claim 1, wherein a through-hole is provided in a center of the rotating shaft member.

4. The biaxial hinge according to claim 1, wherein a rotation stopper mechanism to restrict a rotational range between the rotating shaft member and the rotation-side member is provided.

5. The biaxial hinge according to claim 1, wherein the opening/closing torque unit mechanism for opening and closing operations is assembled as an independent unit, a click generating mechanism that incorporates a cam or a stopper to limit an opening/closing angle is installed beforehand in said opening/closing torque unit mechanism, and the opening/closing torque unit mechanism is fitted to the rotation-side member.

6. An electronic device equipped with the biaxial hinge according to claim 1.

7. The biaxial hinge according to claim 1, wherein two holes are provided in said rotation-side member and the elastic bodies are embedded in the respective holes.

8. The biaxial hinge according to claim 1, wherein the pressing members each have a protruding section on a surface thereof that contacts said elastic body.

9. The biaxial hinge according to claim 1, wherein the pressing members are substantially spherical at their surfaces facing the grooves.

10. The biaxial hinge according to claim 1, wherein the pressing members are cylindrical.

11. The biaxial hinge according to claim 1, wherein the rotating shaft support member and the sliding member are closely fixed to the rotating shaft member.

* * * * *